(12) United States Patent
Arnold et al.

(10) Patent No.: US 6,520,120 B1
(45) Date of Patent: Feb. 18, 2003

(54) SMALL ANIMAL DRYING BAG

(76) Inventors: Faith-Ann Arnold, 3759 York Bl., Los Angeles, CA (US) 90065; Don Hunt, 846 No. McCadden Pl., Los Angeles, CA (US) 90038

( * ) Notice: Subject to any disclaimer, the term of this patent is extended or adjusted under 35 U.S.C. 154(b) by 0 days.

(21) Appl. No.: 09/827,216

(22) Filed: Apr. 4, 2001

Related U.S. Application Data

(60) Provisional application No. 60/194,442, filed on Apr. 4, 2000.

(51) Int. Cl.[7] .............................................. A01K 13/00
(52) U.S. Cl. ....................................... 119/850; 119/678
(58) Field of Search ................................ 119/850, 712, 119/497, 678, 650; D30/144; D22/119

(56) References Cited

U.S. PATENT DOCUMENTS

| | | | | |
|---|---|---|---|---|
| 2,969,767 A | * | 1/1961 | Bassett | 119/497 |
| 3,108,568 A | * | 10/1963 | Whitney et al. | 119/174 |
| 3,150,640 A | * | 9/1964 | Nevitt | 119/416 |
| 3,596,636 A | * | 8/1971 | Stobaugh | 119/174 |
| 4,169,428 A | * | 10/1979 | Waugh | 119/482 |
| D280,560 S | * | 9/1985 | Vitolo | D30/145 |
| D291,014 S | * | 7/1987 | Grum | D22/119 |
| 4,796,567 A | * | 1/1989 | Allan et al. | 119/678 |
| 4,977,857 A | * | 12/1990 | Slawinski | 119/497 |
| 5,060,597 A | * | 10/1991 | Fredericks | 119/678 |
| D344,372 S | * | 2/1994 | Maddix | 383/75 |
| 5,309,866 A | * | 5/1994 | Santoro | 119/650 |

* cited by examiner

*Primary Examiner*—Charles T. Jordan
*Assistant Examiner*—Judith A Nelson
(74) *Attorney, Agent, or Firm*—Jacqueline S. Larson

(57) ABSTRACT

An absorbent fabric bag having an opening of sufficient size to admit an animal into the interior cavity and having at least one area for providing ventilation into the interior of the bag. The bag has a closing device to prevent the contained animal from exiting at will.

21 Claims, 1 Drawing Sheet

FIG. 1

SMALL ANIMAL DRYING BAG

CROSS-REFERENCE TO RELATED APPLICATIONS

This application is entitled to the benefit of co-pending Provisional Patent Application Ser. No. 60/194442 filed Apr. 4, 2000, the entire disclosure of which is incorporated by reference herein.

FIELD OF INVENTION

This invention relates to animal grooming aids, specifically to an absorbent ventilated bag for drying a small animal after bathing.

BACKGROUND OF THE INVENTION

It is common practice to periodically bathe small companion animals such as domestic ferrets, cats, and rabbits that are kept as pets or for showing. The choices available for drying an animal after its bath have been: (1) to let the animal air-dry without intervention by humans, (2) to rub down the animal with a towel or cloth, or (3) to use an electric forced-air hair-drying apparatus. All of these options have serious disadvantages when used on small animals that can be very active, excitable, and difficult to hold.

Small mammals such as domestic ferrets, cats, and rabbits typically have dense fur that retains a large quantity of water after bathing. They also have a relatively small body mass in relation to their surface area. Therefore, they can easily become chilled or hypothermic if left wet for an extended period of time, as when left to air-dry on their own. (Small mammals that are adapted to water, such as otters, have specialized fur that retains an insulating layer of air next to their skin, preventing hypothermia. The domesticated small mammals usually kept as pets do not possess such fur.)

Probably the most common method of drying a small animal is using a towel or cloth. This is often very difficult because the animal usually does not want to hold still after becoming wet. A struggling animal is hard to control for long enough to effectively dry with a towel, and it is possible that the animal's claws will scratch the person.

Ferrets become extremely active after bathing, presumably as a survival mechanism to help them raise their body temperature and thereby avoid hypothermia. A wet ferret will frantically run around, shake itself, and rub against and deposit water on everything it contacts, which could be the carpet, furniture, drapes, or its owner's pant leg. And leaving the animal to dry in a confined area such as its cage is a poor choice. It will get its bedding wet, and the limited space for exercise will increase the risk of hypothermia if the ambient temperature is cool.

And finally, the method of drying these small animals by the use of an electric hair dryer has multiple disadvantages. (1) It is very noisy, which can badly frighten a small mammal. (2) It is difficult to get the animal to hold still during the process of blowing the hot air on its fur. And (3) if the animal is confined to a drying cage or enclosure it can be dangerous for the animal. Due to their small mass, these animals will get overheated very quickly in such an environment once the fur has dried. Enclosed electric pet hair drying apparatuses were generally developed for use on dogs, which are capable of cooling their bodies more efficiently through panting than can the fur-bearing small companion animals.

SUMMARY OF THE INVENTION

The present invention is directed to a small animal drying bag comprising an absorbent fabric bag for containing the small animal, a ventilating system for admitting air into the interior of said bag, and a closing device for closing said bag and holding the bag closed.

The drying bag is useful to safely confine a small animal after the animal is bathed; to absorb excess water from the fur of the animal through passive contact between the bag of the present invention and the fur while the animal is confined within the bag; to absorb excess water when the animal's fur is rubbed, or toweled, with the drying bag of the present invention while the animal is confined within the bag; to keep the animal from escaping the toweling while it is confined within the bag; to reduce the likelihood of the human getting scratched while drying the animal; to reduce the likelihood of said human being excessively wetted by water flung from or dripping from the fur of the animal, or by direct contact with the wet fur of the animal; to prevent the animal from running around freely and thereby wetting objects in the area such as furnishings; to prevent the animal from becoming chilled while it is drying, while at the same time providing adequate ventilation: thus the absorbent fabric and the netting work synergistically, the ventilation netting allowing the animal to stay inside of the drying bag long enough for the excess water to be absorbed from the animal's fur; and to provide a hiding place or retreat for the animal, thereby helping to foster a feeling of safety and security, which may be especially important when bathing cats or rabbits, who generally do not like getting wet and can get very upset by the process of bathing.

BRIEF DESCRIPTION OF THE DRAWINGS

FIG. 1 shows drying bag with a ventilation netting strip around the circumference of the opening, perpendicular to the longitudinal axis.

FIG. 2 shows a similar bag with a ventilation netting strip parallel to the longitudinal axis.

FIG. 3 shows a similar bag with the ventilation netting inserted in openings in the top panel.

Figure 1:
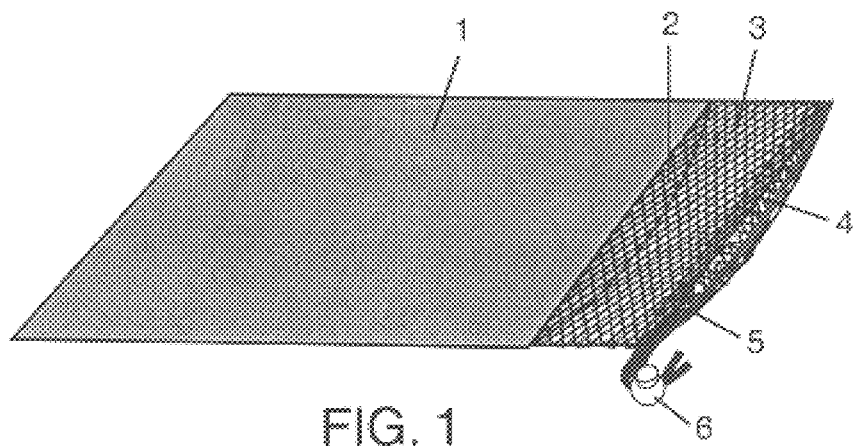
FIGS. 1 through 3 are perspective views of the invention.

REFERENCE NUMERALS IN DRAWINGS 1 absorbent fabric bag
2 open end of absorbent fabric bag
3 ventilation netting
4 opening of ventilation netting
5 drawstring closure
6 cordlock fastener

DETAILED DESCRIPTION OF THE INVENTION

A presently preferred embodiment of the drying bag of the present invention is illustrated in perspective view in FIG. 1. The drying bag consists of one or more pieces of absorbent fabric 1 fastened at or near the edges into the configuration of a bag, with an opening 2 at one end large enough to admit an animal of the desired size. The overall size of the fabric portion of the bag is sufficient to accommodate the desired species of animal within the interior cavity. The preferred method of fastening is sewing. A band of flexible ventilation netting 3 is sewn around the circumference along the open end 2 of the absorbent fabric. The open end 4 of the netting is folded back on itself and sewn, forming a tubular channel that encloses a drawstring 5. The ends of the drawstring are run through a locking device such as a cordlock 6 and tied together near their ends.

Figure 2:
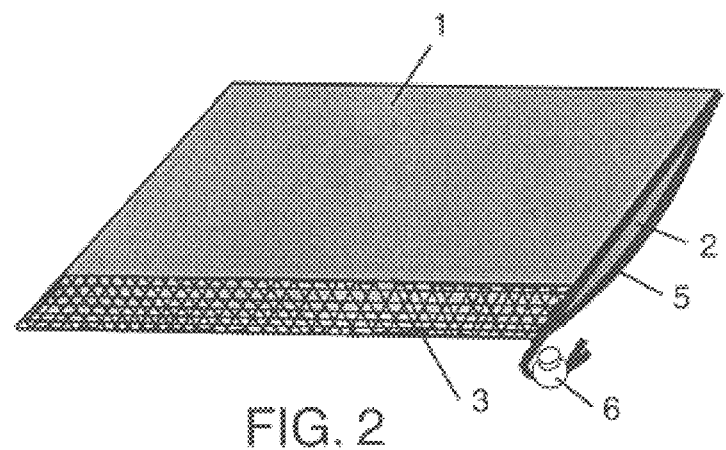
Figure 3:
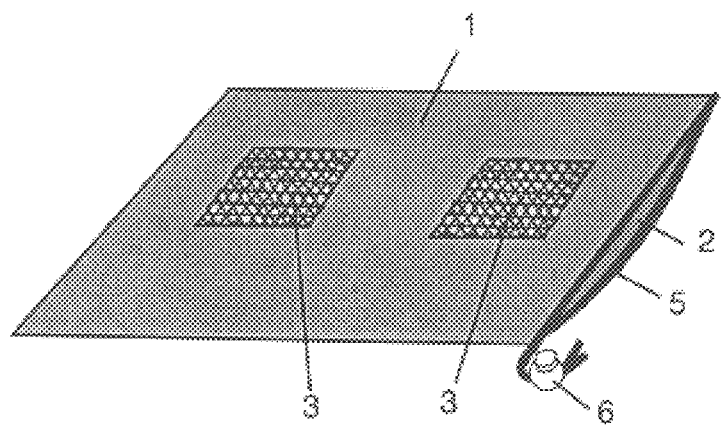

Additional embodiments are shown in FIGS. 2 and 3. FIG. 2 shows a drying bag with the ventilation netting 3 running the length of the absorbent fabric portion 1 of the bag, parallel to the longitudinal axis. The drawstring closure 5 is attached at the open end 2 of the fabric bag in a standard channel, which is not shown. In FIG. 3 the drying bag has ventilation panels of netting 3 inset into openings in the upper side of the fabric 1 of the bag.

The manner of using the small animal drying bag of the present invention, in the preferred embodiment, is as follows: a wet animal small enough to fit comfortably within the bag is passed through openings 4 and 2 into the central cavity comprised of the absorbent fabric 1. Upon placing the animal, the drawstring 5 is quickly pulled to close up the opening and prevent the animal from exiting the bag. The drawstring is then secured with the cordlock 6. An animal placed within the bag will generally move around and rub itself against the interior surface, thereby allowing the absorptive fabric to remove most of the water from the animal's fur. This process of absorption will be enhanced by rubbing the fabric of the bag, by means of one's hands from the outside of the bag, against the fur of the animal. When the majority of free, or excess water has been absorbed from the animal's fur, the animal may be released from the bag. If several animals are to be dried in succession, when the bag becomes very wet or saturated it can be wrung out before placing the next animal within it.

The fabric comprising the main portion of the bag may be chosen from any group of fabrics that are both absorbent and strong enough to resist the digging activity of an animal placed within the bag. Smooth, non-woven, or tightly woven or knitted fabrics are preferred over a loose fabric that may catch an animal's claw. The fabric of the preferred embodiment is a thick, rayon-based non-woven material such as that commonly used for synthetic chamois. Other fabrics that may be used include, but are not limited to cotton, rayon, polyester, hemp and/or combination thereof.

When a synthetic chamois material is used, as in the preferred embodiment of the invention, the advantages of this material are: a very high level of absorbency, with the ability to continue being very absorbent even after saturation, upon being wrung out. This allows persons with multiple animals that need to be bathed and dried to use just one drying bag. The bag can be used over and over by simply wringing it out in between animals as it becomes saturated.

A ventilating system is required for providing air to the small animal for breathing and cooling purposes. A presently preferred ventilating system is one or more panels of a material having small holes, such as mesh or netting. A wide band of ventilation netting is preferred over a narrower band or smaller area to allow adequate ventilation into the interior of the bag. Also, the larger area of ventilation netting in the preferred embodiment of our invention allows the animal to move up into the area of the netting. This permits the animal to avoid getting overheated if for some reason said animal is left in the bag for a protracted period of time.

Another advantage to using ventilation netting in the configuration shown in the preferred embodiment of FIG. 1 is that the channel for the drawstring is sewn from the netting material at the open, or distal end. The open mesh nature of the net gives it less bulk than most fabrics. This means less material bunching up along the drawstring when the drawstring is pulled tightly shut, which provides for a smaller hole remaining in the center of the closed drawstring. A smaller hole is preferred because the smaller hole is less likely to attract the attention of the animal that is enclosed within the bag. A large hole entices an animal with a small head, such as a ferret, to attempt to push its way out through the hole.

The bag could have ventilation panels of different quantities, sizes or shapes. Ventilation could also be achieved by making small holes in the absorbent fabric itself. For instance, if the fabric is made from certain synthetics, holes can be formed by melting, much as small holes for belt buckle prongs are melted through nylon webbing.

A closing device is used to quickly and efficiently close the drying bag after the animal has been placed inside it. Any device generally used in this manner is encompassed by the present invention. A drawstring closure is the preferred method of closing the drying bag due to the rapidity with which the bag opening can be closed after placing an animal within. A locking device may be used if necessary to temporarily and reversibly lock the bag in a closed position while the animal is being dried. For example, a drawstring may be used in conjunction with a cordlock. In addition to a drawstring and cordlock, other closing devices may be chosen from, but are not limited to, a zipper, snaps, hook and loop material (such as Velcro™), a clip, and the like.

The ease with which an animal can be dried by the use of the drying bag of the invention has some unexpected benefits. First, it so vastly simplifies the process of bathing small fur-bearing companion animals such as domestic ferrets, that baths will likely be given to the animals more frequently than would otherwise occur. This makes the keeping of a pet like a ferret much more pleasant or even more feasible. Ferrets have a natural musk scent that at times can become objectionable. Many people dislike the odor of ferrets to the point of not wanting to keep these otherwise endearing animals for pets. This is unfortunate because for people living in small apartments, a small, quiet ferret may be one of the few good choices to have as a companion animal. The use of said drying bag can therefore expand the choices of companion animals available to people.

Second, being bathed can be a stressful experience for many small mammals. Small animals that are prone to becoming hypothermic when wet naturally avoid being immersed in water. They may get very upset and struggle when being bathed. When under stress, many animals will seek out a small, enclosed space where they can hide and feel safe and protected. The drying bag of the invention gives the animal just such a secure place in which to retreat, which may in turn reduce the animal's level of stress at bath time and result in a happier, healthier pet.

Third, by providing a warm place in which to dry off after a bath, the use of the drying bag of the invention allows the animal's owner to keep the temperature lower in the room where the animal is being bathed without fear of the animal becoming chilled. This has the surprising added advantage of saving energy that otherwise would have been used to heat the area, and reducing the heating bill.

Accordingly, the reader will see that the small animal drying bag of this invention provides a new and unique way to make drying an animal after its bath easier, safer, neater, and very likely more pleasant for both the animal and the human who is giving the bath. Furthermore, the drying bag of the invention can be manufactured at a reasonable cost, so it is easily within the means of the average pet owner. Additionally, it is durable under conditions of normal use, and can be laundered repeatedly in ordinary washing machines and dryers with a tolerable amount of shrinkage or wear.

Although the description above contains many specificities, these should not be construed as limiting the scope of the invention but as merely providing illustrations of some of the presently preferred embodiments of this invention. Many other variations are possible. For example, other embodiments that were not illustrated could consist of fabric bags of different shapes or materials, or layers of material. Also, the bag of the present invention could employ a different method of ventilation, including air blown in by some means such as by a small fan or air duct. Also, any color or colors desired may be chosen for the various components of the drying bag of the invention.

What is claimed is:

1. A drying bag for absorbing water from the fur of a small domestic animal, the drying bag consisting of:
    (a) absorbent fabric configured into the shape of a bag;
    (b) an entry opening of sufficient size for entry of said animal into the bag;
    (c) a ventilating system for admitting air into the interior of said bag, the ventilating system comprising at least one panel of a material having small holes; and
    (d) a closing device to reversibly lock the entry opening into a closed position.

2. A drying bag according to claim 1 wherein the absorbent fabric is chamois or synthetic chamois.

3. A drying bag according to claim 1 wherein the ventilating system is at least one ventilation panel of mesh or netting.

4. A drying bag according to claim 1 wherein the closing device is a drawstring.

5. A drying bag according to claim 4 wherein the closing device further comprises a cordlock in conjunction with the drawstring.

6. A drying bag according to claim 3 wherein the ventilation panel is around the circumference of the entry opening, perpendicular to the longitudinal axis of the bag.

7. A drying bag according to claim 1 wherein the absorbent fabric is synthetic chamois; the ventilating system comprises at least one ventilation panel of mesh or netting, the ventilation panel being positioned around the circumference of the entry opening perpendicular to the longitudinal axis of the bag; and the closing device comprises a drawstring in a tubular channel around the entry opening, the drawstring being connected with a cordlock.

8. A method of absorbing water from the fur of a small domestic animal, the method comprising:
    placing a wet animal into a drying bag, the drying bag consisting of: absorbent fabric configured into the shape of a bag; an entry opening of sufficient size for entry of said animal; a ventilating system for admitting air into the interior of said bag, the ventilating system comprising at least one panel of a material having small holes; and a closing device to reversibly lock the entry opening in a closed position;
    closing and securing the entry opening of the drying bag with the closing device;
    allowing the absorptive fabric to remove water from the animal's fur; and
    releasing the animal from the drying bag.

9. A method according to claim 8 which further comprises the step of rubbing the fabric of the drying bag, by means of one's hands from the outside of the bag, against the fur of the animal while the animal is in the drying bag.

10. A method according to claim 8 wherein the absorbent fabric of the drying bag is chamois or synthetic chamois.

11. A method according to claim 8 wherein the ventilating system is at least one ventilation panel of mesh or netting.

12. A method according to claim 8 wherein the closing device is a drawstring.

13. A method according to claim 12 wherein the closing device further comprises a cordlock in conjunction with the drawstring.

14. A method according to claim 11 wherein the ventilation panel is around the circumference of the entry opening, perpendicular to the longitudinal axis of the bag.

15. A method according to claim 8 wherein the absorbent fabric is synthetic chamois; the ventilating system comprises at least one ventilation panel of mesh or netting, the ventilation panel being positioned around the circumference of the entry opening perpendicular to the longitudinal axis of the bag; and the closing device comprises a drawstring in a tubular channel around the entry opening, the drawstring being connected with a cordlock.

16. A drying bag according to claim 1 wherein the absorbent fabric is selected from the group consisting of cotton, rayon, polyester, hemp, and combinations thereof.

17. A drying bag according to claim 1 wherein the absorbent fabric is selected from the group consisting of cotton, rayon, polyester, hemp, and combinations thereof; the ventilating system comprises at least one ventilation panel of mesh or netting, the ventilation panel being positioned around the circumference of the entry opening perpendicular to the longitudinal axis of the bag; and the closing device comprises a drawstring in a tubular channel around the entry opening, the drawstring being connected with a cordlock.

18. A drying bag according to claim 1 wherein the absorbent fabric is selected from the group consisting of cotton, rayon, polyester, hemp, and combinations thereof; the ventilating system comprises at least one ventilation panel of mesh or netting, the ventilation panel being positioned in the upper side of the bag; and the closing device comprises a drawstring in a tubular channel around the entry opening, the drawstring being connected with a cordlock.

19. A method according to claim 8 wherein the absorbent fabric of the drying bag is selected from the group consisting of cotton, rayon, polyester, hemp, and combinations thereof.

20. A method according to claim 8 wherein the absorbent fabric is selected from the group consisting of cotton, rayon, polyester, hemp, and combinations thereof; the ventilating system comprises at least one ventilation panel of mesh or netting, the ventilation panel being positioned around the circumference of the entry opening perpendicular to the longitudinal axis of the bag; and the closing device comprises a drawstring in a tubular channel around the entry opening, the drawstring being connected with a cordlock.

21. A method according to claim 8 wherein the absorbent fabric is selected from the group consisting of cotton, rayon, polyester, hemp, and combinations thereof; the ventilating system comprises at least one ventilation panel of mesh or netting, the ventilation panel being positioned in the upper side of the bag; and the closing device comprises a drawstring in a tubular channel around the entry opening, the drawing being connected with a cordlock.

* * * * *